US007099570B2

(12) United States Patent
Itani

(10) Patent No.: US 7,099,570 B2
(45) Date of Patent: Aug. 29, 2006

(54) VIDEO SIGNAL REPRODUCTION APPARATUS

(75) Inventor: Tetsuya Itani, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1164 days.

(21) Appl. No.: 09/893,939

(22) Filed: Jun. 28, 2001

(65) Prior Publication Data

US 2002/0009295 A1   Jan. 24, 2002

(30) Foreign Application Priority Data

Jun. 29, 2000  (JP) ............................. 2000-196084

(51) Int. Cl.
*H04N 5/91* (2006.01)
(52) U.S. Cl. ...................................... 386/131; 348/445
(58) Field of Classification Search ................. 386/46, 386/95, 109, 112, 129, 131; 348/445, 446
See application file for complete search history.

(56) References Cited

U.S. PATENT DOCUMENTS

| 5,621,469 A |   | 4/1997 | Monta et al. |
| 5,673,086 A | * | 9/1997 | Fukuoka et al. ............ 348/445 |
| 6,014,179 A |   | 1/2000 | Kobayashi et al. |

FOREIGN PATENT DOCUMENTS

| EP | 0716545 A | 6/1996 |
| EP | 0737008 A | 10/1996 |
| EP | 0837601 A | 4/1998 |
| JP | 03218192  | 9/1991 |
| JP | 8-9284    | 1/1996 |

OTHER PUBLICATIONS

"Development of Aspect Ratio Conversion System Using Scan-Line Video Processor", by J. Kim, et al.; International Conference on Comsumer Electronics—Digest of Technicalpapers, Rosemont, Jun. 7-9, 1995, New York, IEEE, US, vol. Conf. 14, Jun. 7, 1995, pp. 46-47.
"Wide-Screen-Signalisierung" Fernseh Und Kinotechnik, Vde Verlag GMBH, Berlin, DE, vol. 49, No. 7/8, Jul. 1, 1995, pp. 429-434, 436-437.

* cited by examiner

*Primary Examiner*—Huy Nguyen
(74) *Attorney, Agent, or Firm*—Snell & Wilmer L.L.P.

(57) ABSTRACT

A video signal reproduction apparatus for receiving an information signal including a video signal and a determination signal indicating a type of the video signal, and reproducing the video signal included in the information signal. The apparatus comprises a conversion section for converting the video signal to a progressive scan video signal, and an aspect ratio conversion section for converting an aspect ratio of the progressive scan video signal output from the conversion section and outputting the converted progressive scan video signal to a progressive scan video monitor. The aspect ratio conversion section converts the aspect ratio of the progressive scan video signal based on the determination signal indicating the type of the video signal and monitor information indicating a type of the progressive scan video monitor.

13 Claims, 15 Drawing Sheets

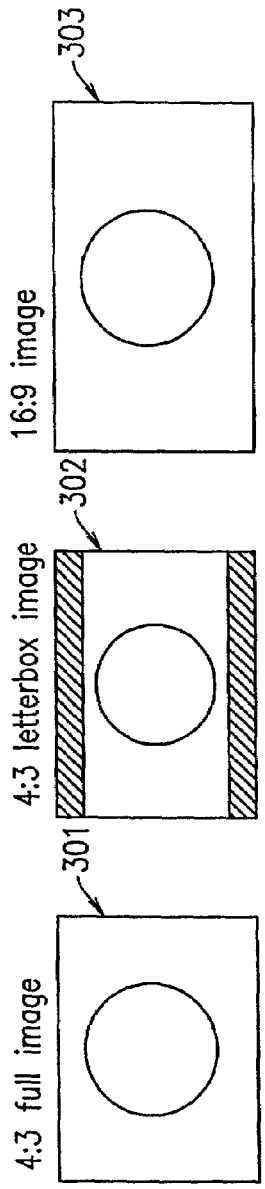
FIG.3A Forms of video signals reproduced from disk 1
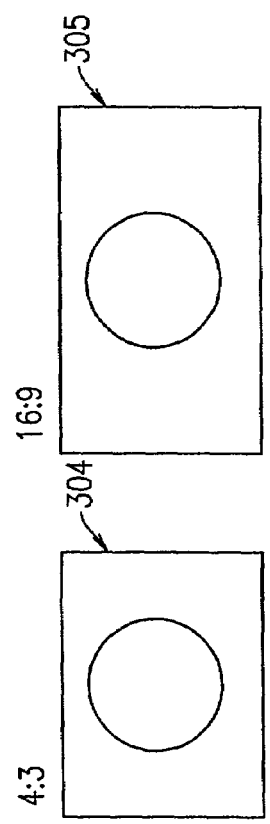
FIG.3B Aspect ratio of interlaced scan video monitor
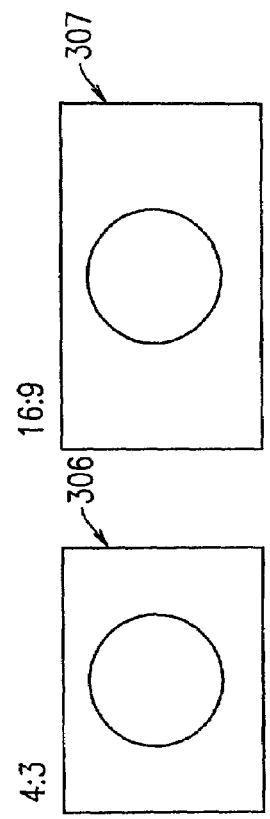
FIG.3C Aspect ratio of progressive scan video monitor

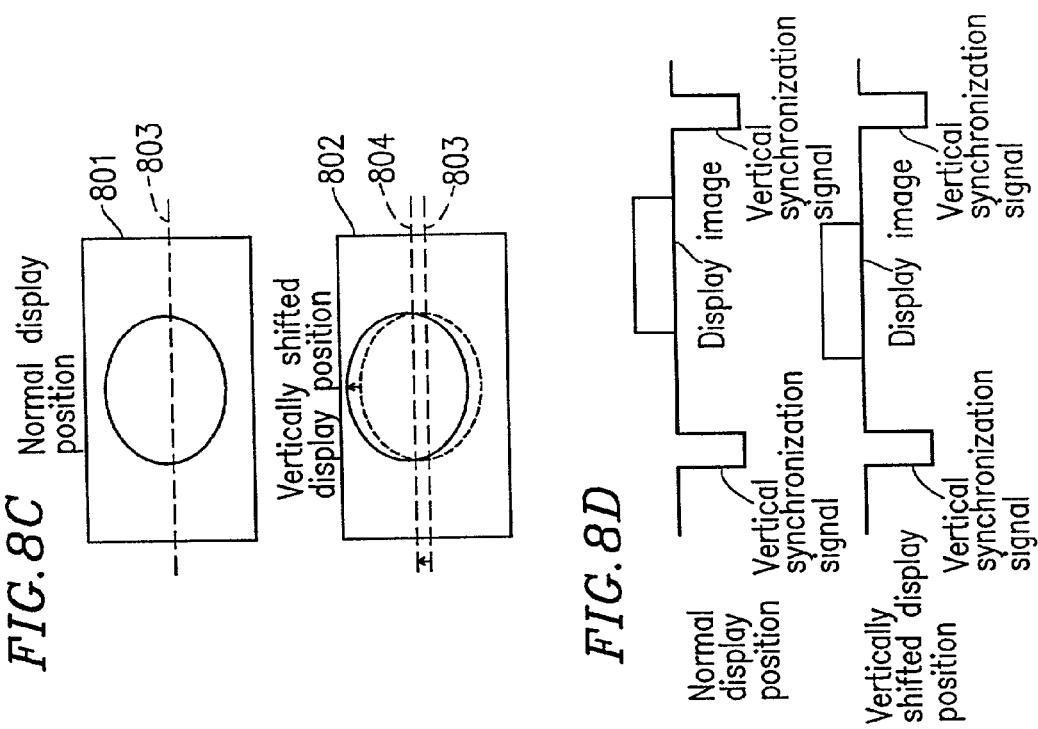
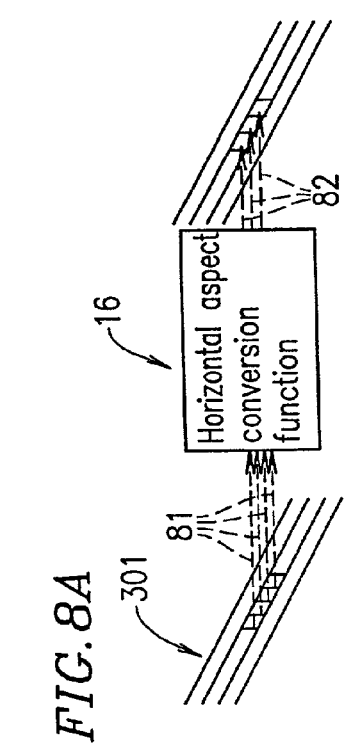
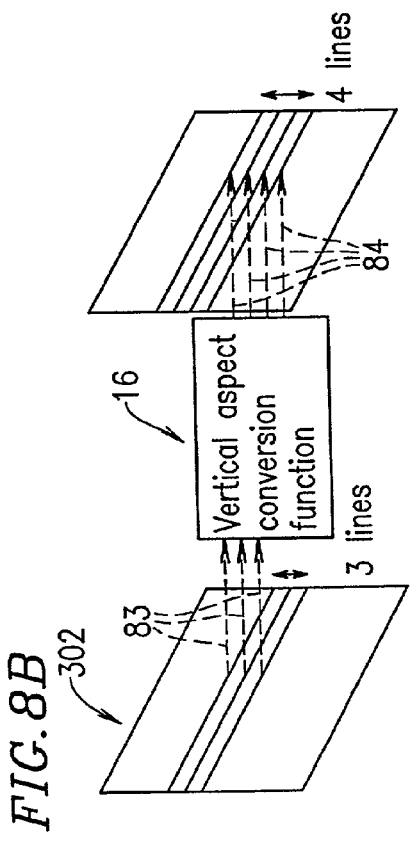

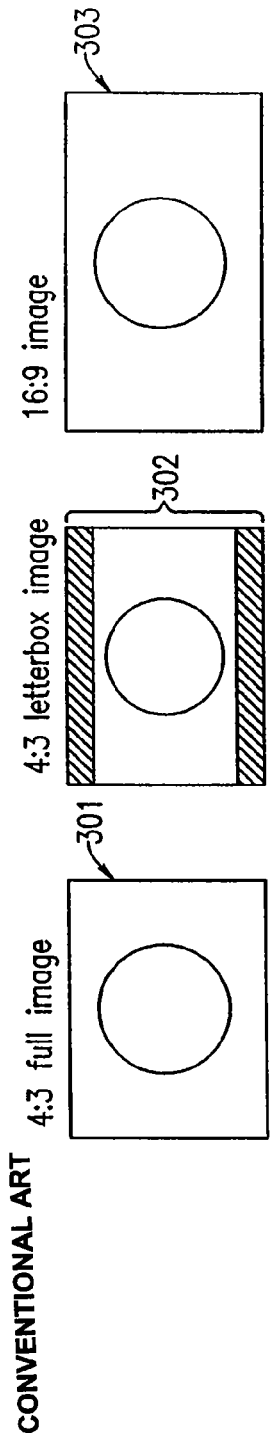
FIG.14A Forms of video signals reproduced from disk 1
CONVENTIONAL ART
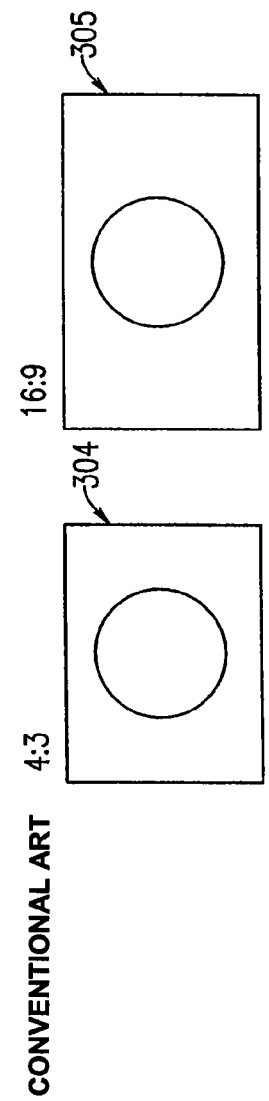
FIG.14B Aspect ratio of interlaced scan video monitor
CONVENTIONAL ART
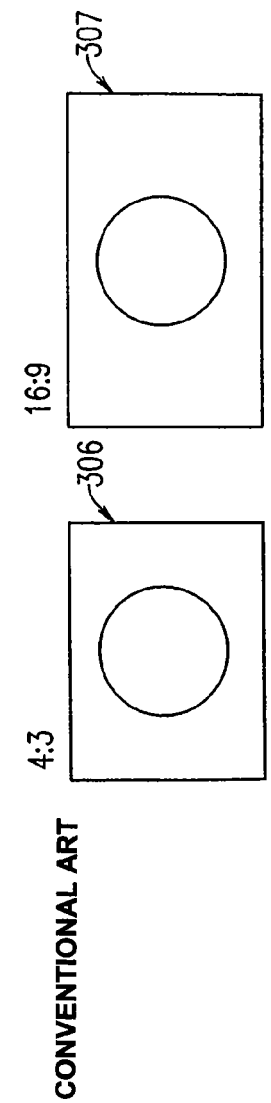
FIG.14C Aspect ratio of progressive scan video monitor
CONVENTIONAL ART

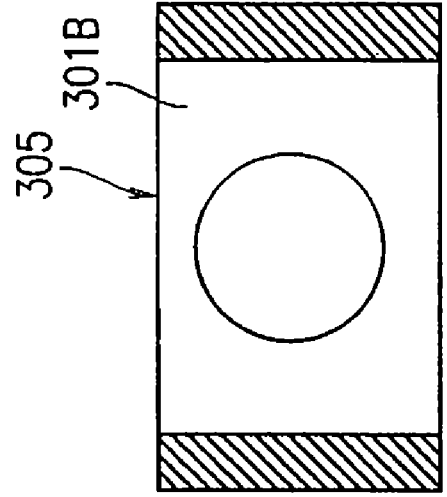
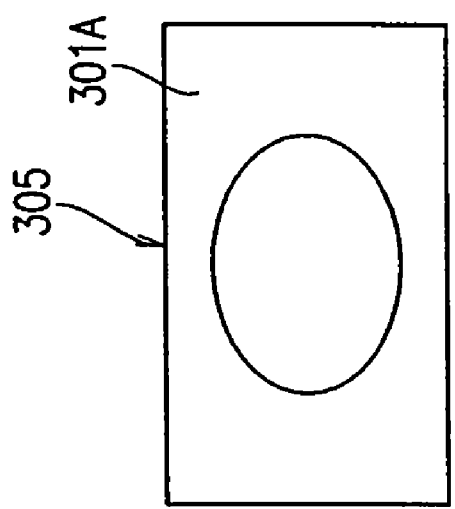
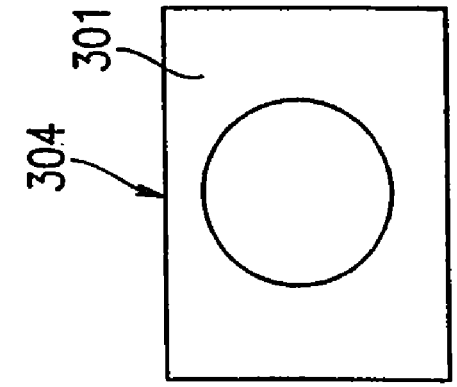

VIDEO SIGNAL REPRODUCTION APPARATUS

BACKGROUND OF THE INVENTION

1. Field of the Invention

The present invention relates to a video signal reproduction apparatus for reproducing, as a progressive scan video signal, a video signal recorded in tape media, disk media, and the like, or a video signal carrying various image information such as movie materials or video materials through satellite broadcast, ground-based broadcast, and the like.

2. Description of the Related Art

Conventionally, video signals recorded in tape or disk media, or video signals transmitted through satellite broadcast, cable broadcast, or ground-based broadcast are commonly output as interlaced scan video signals by video signal reproduction apparatuses so that the video signals can be reproduced by image receivers. Recently, video signal reproducing apparatuses for converting interlaced scan video signals into progressive scan video signals are being introduced as monitors and projectors compatible with multi-scanning, or monitors for computers are becoming widespread.

The term "aspect ratio" as used herein refers to a ratio of the horizontal size of an image to the vertical size of the image as well as a ratio of the horizontal size of a monitor screen displaying an image to the vertical size of the monitor screen.

FIG. 12 is a block diagram showing a configuration of a conventional video signal reproducing apparatus 1200 which reproduces an information signal recorded in a disk-type medium. In FIG. 12, reference numeral 1 denotes a disk on which an information signal is recorded in an encoded and modulated signal form suitable for recording (or reproducing) in advance. The information signal includes a video signal and a determination flag indicating the type of the video signal.

The video signal reproducing apparatus 1200 includes: a pickup 2 for transforming an information signal recorded on the disk 1 to an electrical signal; a disk rotating apparatus 3 for rotating the disk 1 at a certain revolution-per-minute suitable for the disk 1; a material determination circuit 5 for determining the type of a video signal based on the determination flag included in the information signal; a converter 101 for converting the electrical signal transformed by the pickup 2 to an interlaced scan video signal and a progressive scan video signal; an encoder 7 for converting the interlaced scan video signal into an NTSC video format and outputs the result through an interlaced scan video output terminal 8 to an interlaced scan video monitor 103; and a color difference converter 10 for converting the progressive scan video signal output from the converter 101 into an analog color difference signal and outputs the result through a progressive scan video output terminal 11 to a progressive scan video monitor 104.

The converter 101 includes: an interlaced scan video signal reproduction circuit 4 for demodulating and decoding the electrical signal output from the pickup 2 and outputting the resultant signal as an interlaced scan video signal; an interlaced scan aspect ratio conversion circuit 6 for converting the aspect ratio of the interlaced scan video signal and outputs the result; an interlaced scan aspect ratio designating section 13 which is used by a user to designate the aspect ratio of the interlaced scan video monitor 103; an interlaced scan control circuit 12 for controlling the interlaced scan aspect ratio conversion circuit 6 based on the video signal type determined by the material determination circuit 5 and the type of the interlaced scan video monitor 103 designated by the interlaced scan designating section 13, and a progressive scan video signal conversion circuit 9 for converting the interlaced scan video signal having the converted aspect ratio into a progressive scan video signal and outputting the result.

The operation of the conventional video signal reproduction apparatus thus constructed will be described with reference to FIGS. 13 through 21.

FIG. 13 is a schematic diagram showing the structure of a video signal reproduced from the disk 1. In an interlaced scan video signal, one field of image is created in 1/60 second. One frame of image is composed of two fields. The number of vertical pixels of each of the two fields is 240. The scan lines of the two field are alternately arranged. In other words, a pixel of one field is disposed between two adjacent pixels of the other field in the vertical direction. In a progressive scan video signal, one frame is created in 1/60 second and the number of pixels of one frame in the vertical direction is 480. Both have a vertical frequency of 1/60 second. The number of horizontal scan lines of the progressive scan video signal is twice as many as that of the interlaced scan video signal. The horizontal scan frequency of the interlaced scan video signal is about 15.75 KHz, while that of the progressive scan video signal is double, i.e., about 31.5 KHz.

FIG. 14A is a schematic signal diagram showing the structure of the video signal reproduced from the disk 1. As shown in FIG. 14A, the video signal reproduced from the disk 1 has three forms. A first form of video signal represents an image having information which fills a full screen of 4:3 (hereinafter referred to as a 4:3 full image 301). A second form of video signal represents an image of 16:9 in the middle of the 4:3 screen, the upper and lower portions of the screen being shaded (hereinafter referred to as a 4:3 letter-box image 302). A third form of video signal represents an image having information which fills a full screen of 16:9 (hereinafter referred to as a 16:9 full image 303).

FIG. 14B shows the aspect ratio of the interlaced scan video monitor 103. As shown in FIG. 14B, there are two types of monitors for the interlaced scan video monitor 103, one monitor 304 having an aspect ratio of 4:3 and the other monitor 305 having an aspect ratio of 16:9.

FIG. 14C shows the aspect ratio of the progressive scan video monitor 104. As shown in FIG. 14C, there are two types of monitors for the progressive scan video monitor 104, one monitor 306 having an aspect ratio of 4:3 and the other monitor 307 having an aspect ratio of 16:9.

The interlaced scan video signal reproduction circuit 4 reads a video signal recorded on the disk 1 from an output of the pickup 2, reproduces an interlaced scan video signal, and outputs the result to the interlaced scan aspect ratio conversion circuit 6. The material determination circuit 5 reads the determination flag from an output of the pickup 2, determines the type of the video signal, and outputs the result as a determination signal to the interlaced scan control circuit 12.

A user designates the type (aspect ratio) of the interlaced scan video monitor 103 through which the user intends to output an interlaced scan video signal, using the interlaced scan aspect ratio designating section 13. The interlaced scan control circuit 12 controls the interlaced scan aspect ratio conversion circuit 6 based on a determination signal output from the material determination circuit 5 and the type (aspect ratio) of the interlaced scan video monitor 103 designated by the interlaced scan aspect ratio designating section 13.

FIG. 15 is a schematic diagram for explaining the operation of the interlaced scan aspect ratio conversion circuit 6. Assuming that the interlaced scan video monitor 103 has an aspect ratio of 4:3, the interlaced scan aspect ratio conversion circuit 6 has a function which compresses the 16:9 image 303 having an aspect ratio of 16:9 in the vertical direction. Specifically, in order to display the 16:9 image 303 on the 4:3 monitor 304 at the correct aspect ratio, 4 lines of information of an input video signal are subjected to a filtering process so that 3 lines of information are generated. Such a process is performed for the entire screen, so that the entire screen is compressed in the vertical direction. In this case, the displayed image has a correct aspect ratio (16:9), but leaving blanks in the upper and lower portions. Such portions are rendered black images. This aspect ratio conversion function can switch between a working state and a non-working state using the interlaced scan control circuit 12. In the case of the non-working state, the interlaced scan aspect ratio conversion circuit 6 outputs a received interlaced scan video signal without the aspect ratio conversion.

In FIG. 12, the user designates as the type (aspect ratio) of the 16:9 image 303, through which the user intends to output an image, the monitor 304 having an aspect ratio of 4:3 or the monitor 305 having an aspect ratio of 16:9 using the interlaced scan aspect ratio designating section 13. The material determination circuit 5 outputs the aspect ratio of an image source, i.e., one of the 4:3 full screen 301 or the 4:3 letterbox screen 302, and the 16:9 screen 303, to the interlaced scan control circuit 12. The interlaced scan control circuit 12 causes the aspect ratio conversion function of the interlaced scan aspect ratio conversion circuit 6 to be in the non-working state when the material determination circuit 5 indicates that the type of an image source is the 4:3 full image 301 or the 4:3 letterbox image 302. The interlaced scan control circuit 12 causes the aspect ratio conversion function of the interlaced scan aspect ratio conversion circuit 6 to be in the non-working state when the material determination circuit 5 indicates that the type of the image source is the 16:9 image 303 and the interlaced scan aspect ratio designating section 13 designates the monitor 305 having an aspect ratio of 16:9. Note that the interlaced scan control circuit 12 causes the aspect ratio conversion function of the interlaced scan aspect ratio conversion circuit 6 to be in the working state when the material determination circuit 5 indicates that the type of the image source is the 16:9 image 303 and the interlaced scan aspect ratio designating section 13 designates the monitor 304 having an aspect ratio of 4:3.

The encoder 7 converts an output of the interlaced scan aspect ratio conversion circuit 6 to the NTSC video format. The encoder 7 outputs an interlaced scanned image having the NTSC video format through the interlaced scanned image output terminal 8 to the interlaced scan video monitor 103.

FIGS. 16A through 16C are schematic diagrams for explaining the 4:3 full image displayed on an interlaced scan video monitor. As shown in FIG. 16A, the 4:3 full image 301 displayed on the 4:3 interlaced scan video monitor 304 has the correct aspect ratio. However, a 4:3 full image 301A displayed by the 16:9 interlaced scan video monitor 305 does not have the correct aspect ratio, so that the displayed image is extended horizontally as shown in FIG. 16B. The 16:9 interlaced scan video monitor 305 includes a 4:3 output switch function since the standard aspect ratio of an interlaced scan video signal is 4:3. As shown in FIG. 16C, the 16:9 interlaced scan video monitor 305 can display a 4:3 full image 301B having the correct 4:3 aspect ratio using the 4:3 output switch function.

FIGS. 17A through 17D are schematic diagrams for explaining the 4:3 letterbox image displayed on an interlaced scan video monitor. As shown in FIG. 17A, the 4:3 letterbox image 302 displayed on the 4:3 interlaced scan video monitor 304 has the correct aspect ratio. However, as shown in FIG. 17B, the 4:3 letterbox image 302A displayed on the 16:9 interlaced scan video monitor 305 does not have the correct aspect ratio, so that the displayed image is extended horizontally. The interlaced scan video monitor includes a 4:3 letterbox image output switch function since the standard aspect ratio of interlaced scan video signal is 4:3. With the 4:3 letterbox output switch function, as shown in FIG. 17C, the 4:3 letterbox image 302A is extended both upward and downward so that a 4:3 letterbox image 302B fills the full screen. Therefore, the interlaced scan video monitor 305 can display a 4:3 letterbox image at a correct aspect ratio of 16:9. An image source may have subtitle information 302C at the lower blank portion of an image. In this case, when a 4:3 letterbox image (302A) is extended upward and downward so that the 4:3 letterbox image (302B) fills a full screen and is displayed at a correct aspect ratio of 16:9, the subtitle information 302C disappears. To avoid such a situation, the interlaced scan video monitor 305 has a switch function with which the subtitle information 302 is shifted upward to be viewed on the screen.

FIGS. 18A through 18C are schematic diagrams for explaining a 16:9 image displayed on an interlaced scan video monitor. As shown in FIG. 18A, when a 16:9 image 303A is displayed as it is on the 4:3 interlaced scan video monitor 304, the image does not have the correct aspect ratio, such that the displayed image is extended vertically. However, if the user teaches the interlaced scan aspect ratio designating section 13 that an interlaced scan monitor to be connected to the apparatus 1200 is the 16:9 interlaced scan monitor 305, the interlaced scan aspect ratio conversion circuit 6 is activated and the aspect ratio is converted so that an image (16:9 image 303B) is correctly displayed as shown in FIG. 18B. In addition, as shown in FIG. 18C, the 16:9 interlaced scan video monitor 305 displays a 16:9 image 303 at a correct aspect ratio of 16:9.

Specifically, in the conventional video signal reproduction apparatus 1200, the interlaced scan video monitor can display images having a correct aspect ratio in any combination of 3 types of image sources, i.e., the 4:3 full image, the 4:3 letterbox image, and the 16:9 image with 2 types of video monitors, i.e., the 4:3 monitor and the 16:9 monitor.

An output of the interlaced scan aspect ratio conversion circuit 6 is input to the progressive scan video signal conversion circuit 9. The progressive scan video signal conversion circuit 9 converts an input interlaced scan video signal to a progressive scan video signal, and outputs the result. The color difference converter 10 converts the progressive scan video signal to a color difference video signal, and outputs the progressive scan video output through the progressive scan video output terminal 11 to the progressive scan video monitor 104.

FIGS. 19A and 19B are schematic diagrams for explaining a 4:3 full image displayed on a progressive scan video monitor. As shown in FIG. 19A, the 4:3 full image 301 displayed on the 4:3 progressive scan video monitor 306 has the correct aspect ratio. However, as shown in FIG. 19B, a 4:3 full image 301C displayed on the 16:9 progressive scan video monitor 307 does not have the correct aspect ratio, so that the displayed image is extended horizontally. Here, the 16:9 progressive scan video monitor is a monitor intended to receive a high-definition television signal, and has a standard aspect ratio of 16:9 but does not include a 4:3 output mode. Therefore, a 4:3 full image is not displayed at the correct aspect.

FIGS. 20A and 20B are schematic diagrams for explaining a 4:3 letterbox image displayed on the progressive scan video monitor. As shown in FIG. 20A, the 4:3 letterbox image 302 displayed on the 4:3 progressive scan video monitor 306 has the correct aspect ratio. However, as shown in FIG. 20B, a 4:3 letterbox image 302C displayed on the 16:9 progressive scan video monitor 307 does not have the correct aspect ratio, so that the displayed image is extended horizontally. As described above, the 16:9 progressive scan video monitor 307 is a monitor intended to receive a high-definition television signal, and has a standard aspect ratio of 16:9 but does not include a 4:3 output mode. Therefore, a 4:3 full image is not displayed at the correct aspect.

FIGS. 21A through 21C are schematic diagrams for explaining a 16:9 image displayed on an interlaced scan video monitor. As shown in FIG. 21A, when a 16:9 image 303C is displayed as it is on the 4:3 progressive scan video monitor 306, the image does not have the correct aspect ratio, such that the displayed image is extended vertically. However, if the user teaches the interlaced scan aspect ratio designating section 13 that a progressive scan video monitor to be connected to the apparatus 1200 is the 16:9 interlaced scan monitor 307, the interlaced scan aspect ratio conversion circuit 6 is activated and the aspect ratio is converted so that an image (16:9 image 303D) is correctly displayed as shown in FIG. 21B. In addition, as shown in FIG. 21C, the 16:9 progressive scan video monitor 307 displays a 16:9 image 303 at a correct aspect ratio of 16:9.

As described above, in the conventional video signal reproduction apparatus 1200, there is a problem in that a 4:3 full image and a 4:3 letterbox image cannot be displayed on a 16:9 video monitor at the correct aspect ratio.

Further, when a 4:3 letterbox image includes a subtitle at a lower portion of the screen, there is a problem in that if the 4:3 letterbox image is extended upward and downward so as to be displayed at the correct ratio on a 16:9 video monitor, the subtitle disappears.

Accordingly, there is a demand for a video signal reproduction apparatus in which in any combination of 3 types of image sources, i.e., the 4:3 full image, the 4:3 letterbox image, and the 16:9 image with 2 types video monitor, i.e., the 4:3 monitor and the 16:9 monitor, any image can be displayed at the correct aspect ratio. Even when the 4:3 letterbox image includes a subtitle at a lower portion of the screen, the disappearance of the subtitle needs to be prevented.

SUMMARY OF THE INVENTION

According to one aspect of the present invention, a video signal reproduction apparatus is provided for receiving an information signal including a video signal and a determination signal indicating a type of the video signal, and reproducing the video signal included in the information signal. The apparatus comprises a conversion section for converting the video signal to a progressive scan video signal, and an aspect ratio conversion section for converting an aspect ratio of the progressive scan video signal output from the conversion section and outputting the converted progressive scan video signal to a progressive scan video monitor. The aspect ratio conversion section converts the aspect ratio of the progressive scan video signal based on the determination signal indicating the type of the video signal and monitor information indicating a type of the progressive scan video monitor.

In one aspect of this invention, the aspect ratio conversion section converts the aspect ratio of the progressive scan video signal so that the progressive scan video signal is displayed on the progressive scan video monitor at a correct aspect ratio.

In one aspect of this invention, the aspect ratio includes first and second aspect ratios, the video signal includes a video signal representing a first image having the first aspect ratio and a second image having the second aspect ratio, the progressive scan video monitor includes a first monitor having the first aspect ratio and a second monitor having the second aspect ratio, and the aspect ratio conversion section converts the aspect ratio of the progressive scan video signal when the determination signal indicates the first image as having the first aspect ratio and the monitor information indicates the second monitor as having the second aspect ratio.

In one aspect of this invention, the first image includes a full image having the first aspect ratio, the aspect ratio conversion section converts the aspect ratio of the progressive scan video signal so that the full image represented by the progressive scan video signal is compressed in a horizontal direction, when the determination signal indicates the full image.

In one aspect of this invention, the second monitor having the second aspect ratio extends the full image having the first aspect ratio in a horizontal direction by a factor of (M/N) where M and N are integers and M>N. The aspect ratio conversion section compresses the full image in the horizontal direction by a factor of (N/M) so that the full image having the first aspect ratio is displayed on the second monitor having the second aspect ratio at a correct aspect ratio.

In one aspect of this invention, the aspect ratio conversion section renders a blank portion resulting from the compression of the full image in the horizontal direction as a black image.

In one aspect of this invention, the first image includes a letterbox image including the first aspect. When the determination signal indicates the letterbox image, the aspect ratio conversion section converts the aspect ratio of the progressive scan video signal so that the letterbox image represented by the progressive scan video signal is extended in a vertical direction.

In one aspect of this invention, the second monitor having the second aspect ratio extends the letterbox image having the first aspect ratio in a horizontal direction by a factor of (M/N) where M and N are integers and M>N. The aspect ratio conversion section extends the letterbox image in a vertical direction by a factor of (M/N) so that the letterbox image having the first aspect ratio is displayed on the second monitor having the second aspect ratio at a correct aspect ratio.

In one aspect of this invention, the letterbox image includes a subtitle displayed at an upper or lower portion of the letterbox image. The aspect ratio conversion section shifts the letterbox image represented by the progressive scan video signal so that the subtitle is prevented from disappearing from the second monitor having the second aspect ratio included in the progressive scan video monitor when the letterbox image is extended in the vertical direction.

In one aspect of this invention, the first aspect ratio is 4:3 and the second aspect ratio is 16:9.

In one aspect of this invention, the aspect ratio conversion section includes an aspect ratio conversion circuit for converting an aspect ratio of the progressive scan video signal and outputting the converted progressive scan video signal to the progressive scan video monitor, a designating section for designating the monitor information indicating the type of the progressive scan video monitor, and a control circuit for controlling the aspect ratio conversion circuit based on the determination signal and the monitor information designated by the designating section.

In one aspect of this invention, the conversion section includes an interlaced scan video signal reproduction section for reproducing the video signal as an interlaced scan video signal having 60 fields per second, an interlaced scanned aspect ratio conversion section for converting an aspect ratio of the interlaced scan video signal reproduced by the interlaced scan video signal reproduction section, and a progressive scan video signal conversion section for converting the interlaced scan video signal, the aspect ratio of the interlaced scan video signal being converted by the interlaced scan video signal reproduction section, into the progressive scan video signal.

In one aspect of this invention, the conversion section further includes an interlaced scan designating section for designating interlaced scan monitor information indicating a type of the interlaced scan video monitor, and an interlaced scan control circuit for controlling the interlaced scan aspect ratio conversion section based on the determination signal and the interlaced scan monitor information designated by the interlaced scan designating section.

Thus, the invention described herein makes possible the advantages of providing (1) a video signal reproduction apparatus which can display an image at the correct aspect ratio in the case of all combinations of image sources having different aspects with monitors having different aspects; and (2) a video signal reproduction apparatus in which even when a 4:3 letterbox image includes a subtitle at a lower portion of a screen, the disappearance of the subtitle can be prevented.

These and other advantages of the present invention will become apparent to those skilled in the art upon reading and understanding the following detailed description with reference to the accompanying figures.

BRIEF DESCRIPTION OF THE DRAWINGS

FIG. 3A is a schematic signal diagram showing the type of a video signal according to the example of the present invention.

FIG. 3B is a schematic signal diagram showing the type of an interlaced scan video monitor according to the example of the present invention.

FIG. 3C is a schematic signal diagram showing the type of a progressive scan video monitor according to the example of the present invention.

FIGS. 8A through 8D are schematic diagrams for explaining the operation of an aspect ratio conversion circuit according to the example of the present invention.

FIG. 14A is a schematic signal diagram showing the type of a video signal.

FIG. 14B is a schematic signal diagram showing the type of an interlaced scan video monitor.

FIG. 14C is a schematic signal diagram showing the type of a progressive scan video monitor.

FIGS. 16A through 16C are schematic diagrams for explaining a 4:3 full image displayed on an interlaced scan video monitor.

DESCRIPTION OF THE PREFERRED EMBODIMENTS

Hereinafter, the present invention will be described by way of illustrative examples with reference to the accompanying drawings.

Figure 1:
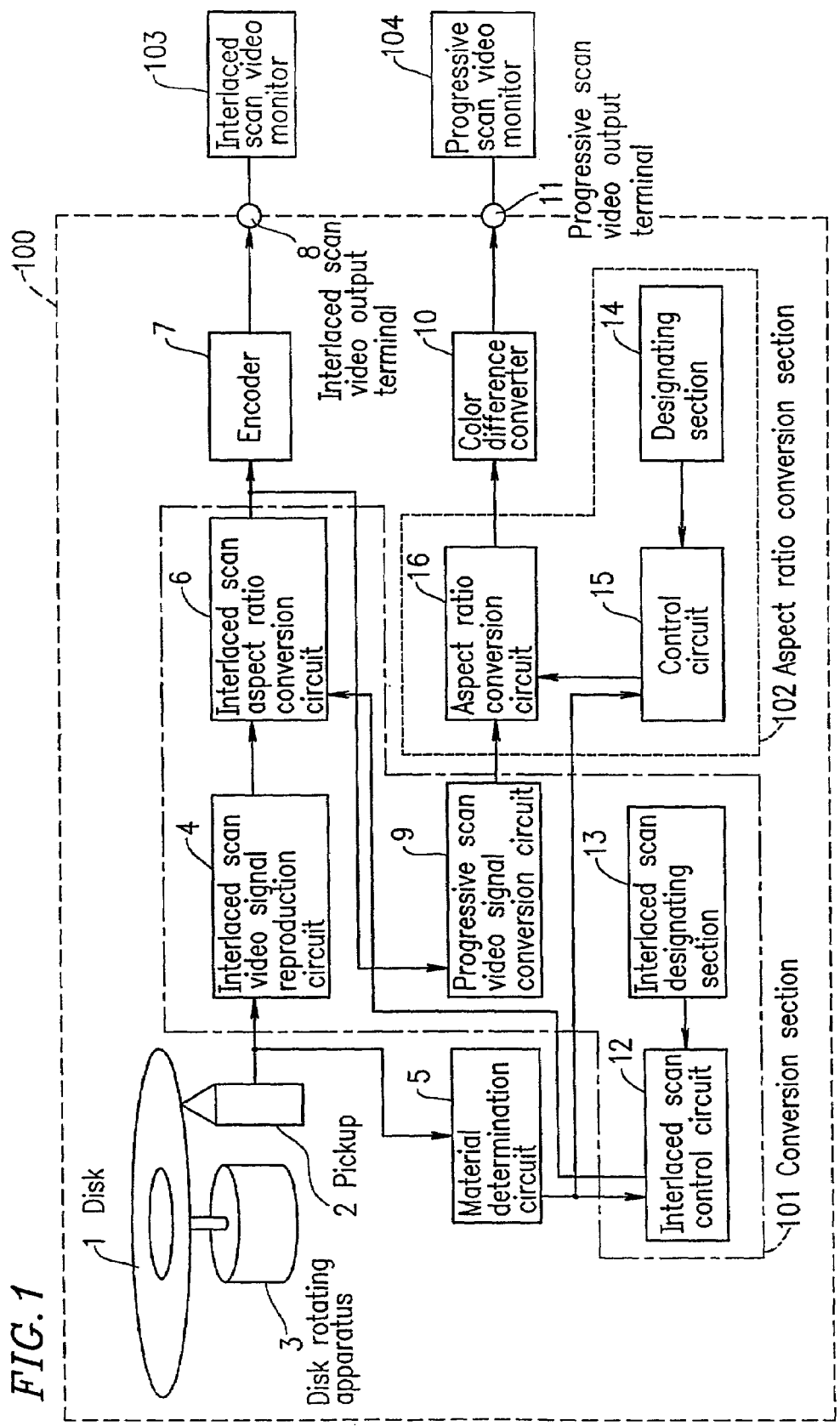
FIG. 1 is a block diagram showing a configuration of a video signal reproduction apparatus according to an example of the present invention.
Figure 12:
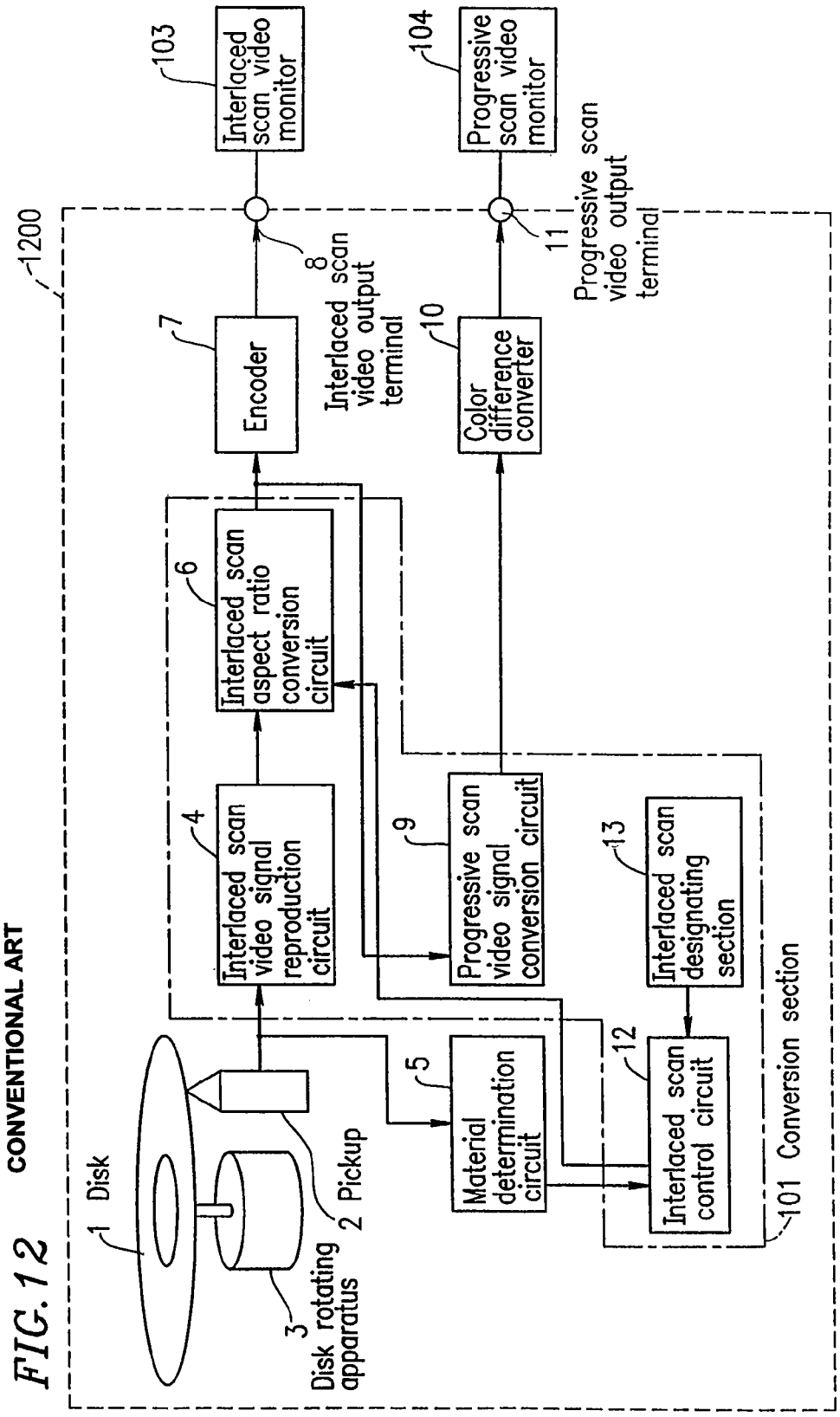
FIG. 12 is a block diagram showing a configuration of a conventional video signal reproducing apparatus.
Figure 13:
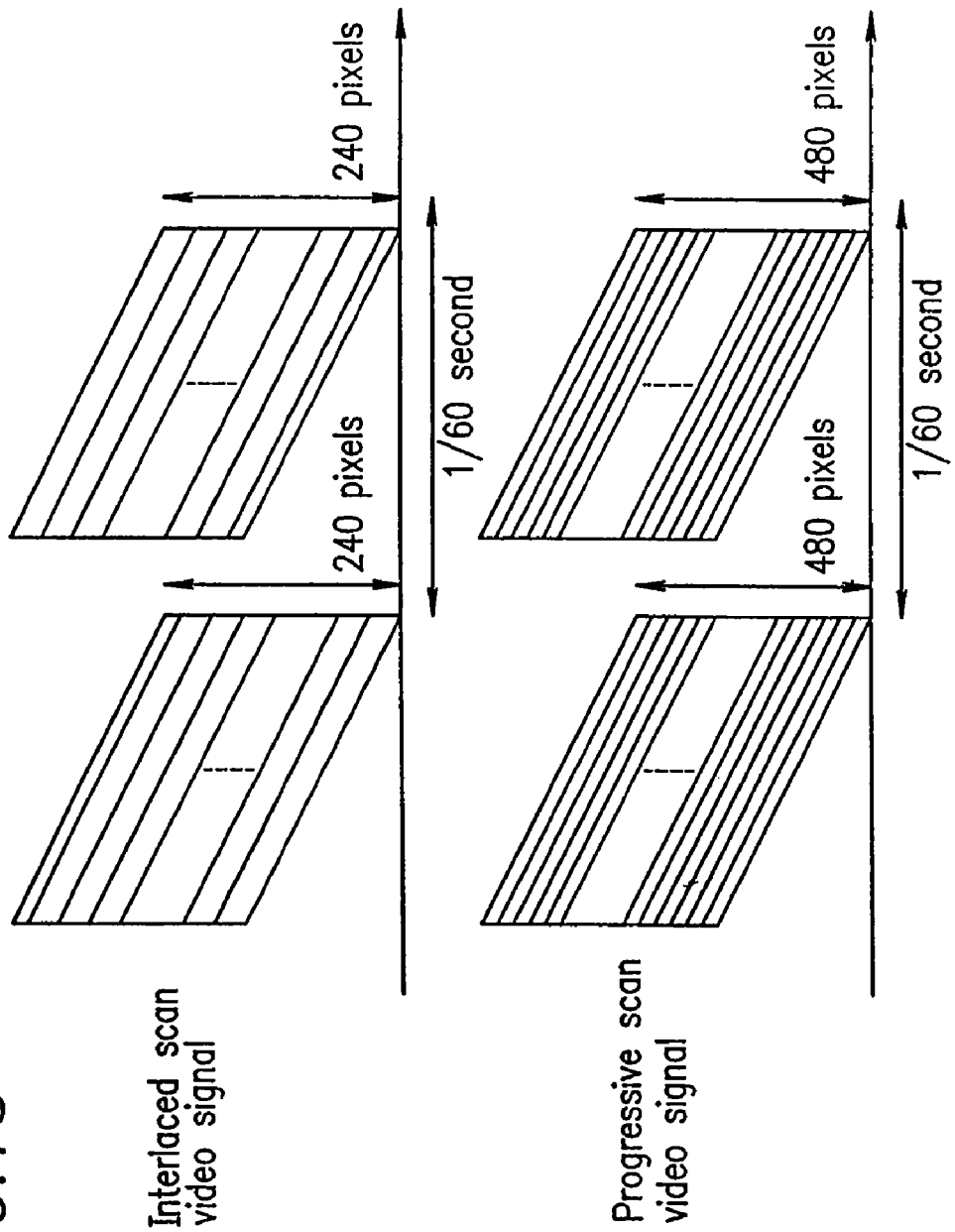
FIG. 13 is a schematic diagram showing the structure of a video signal recorded in a disk.
Figure 15:
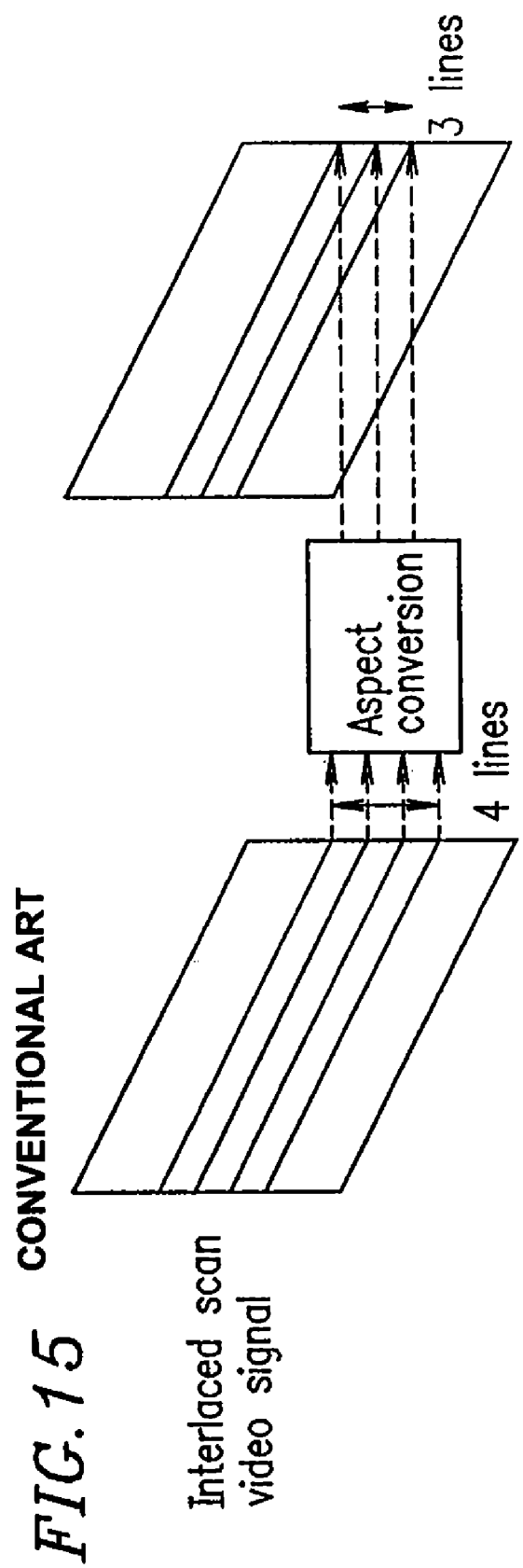
FIG. 15 is a schematic diagram for explaining the operation of an interlaced scan aspect ratio conversion circuit.
Figure 17A:
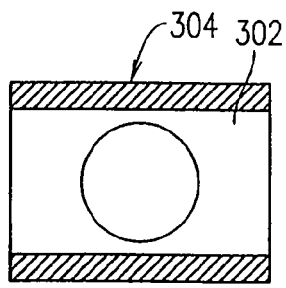
FIGS. 17A through 17D are schematic diagrams for explaining a 4:3 letterbox image displayed on an interlaced scan video monitor.
Figure 17B:
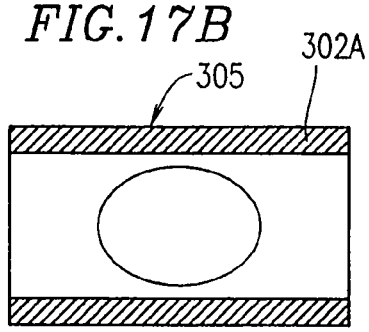
Figure 17C:
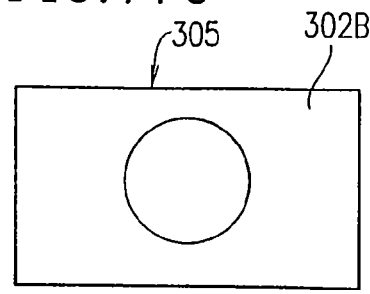
Figure 17D:
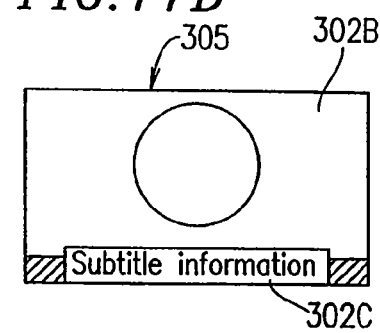
Figure 18A:
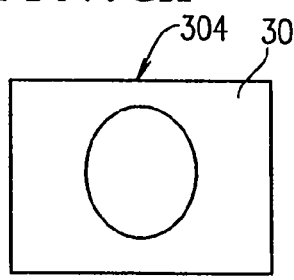
FIGS. 18A through 18C are schematic diagrams for explaining a 16:9 image displayed on an interlaced scan video monitor.
Figure 18B:
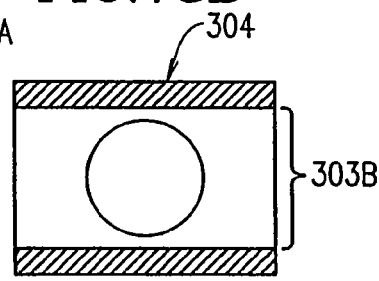
Figure 18C:
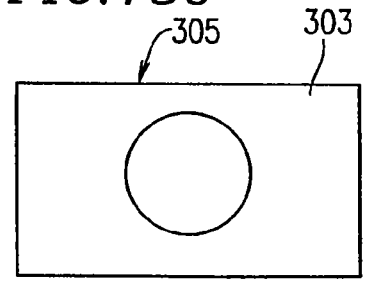
Figure 19A:
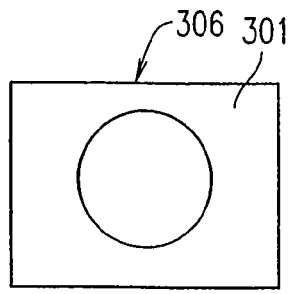
FIGS. 19A through 19B are schematic diagrams for explaining a 4:3 full image displayed on a progressive scan video monitor.
Figure 19B:
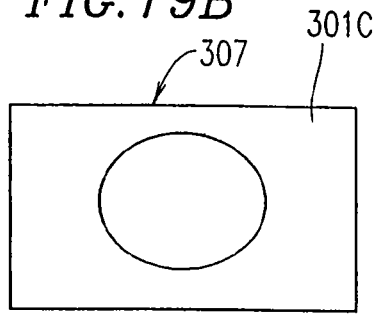
Figure 20A:
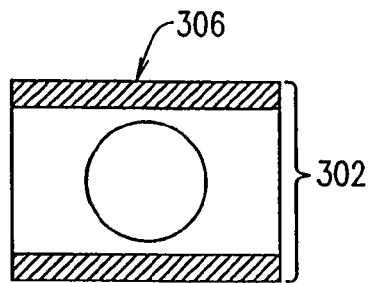
FIGS. 20A through 20B are schematic diagrams for explaining a 4:3 letterbox image displayed on a progressive scan video monitor.
Figure 20B:
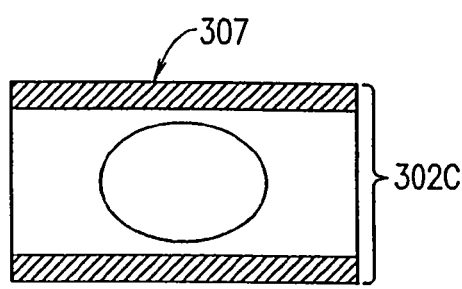
Figure 21A:
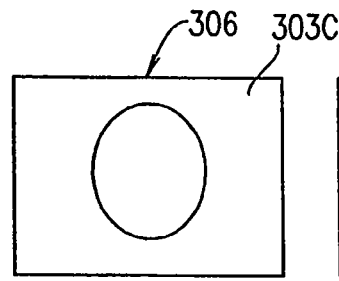
FIGS. 21A through 21C are schematic diagrams for explaining a 16:9 image displayed on a progressive scan video monitor.
Figure 21B:
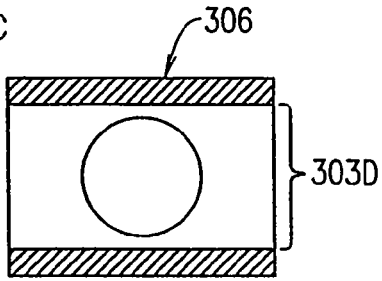
Figure 21C:
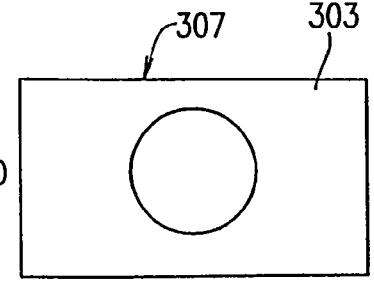

FIG. 1 is a block diagram showing a configuration of a video signal reproducing apparatus 100 according to the present invention which reproduces an information signal recorded in a disk-type medium. The same parts as those of corresponding parts of the video signal reproducing apparatus 1200 of FIG. 12 are referred to by the same reference characters. The description of these parts is thus omitted.

In FIG. 1, reference numeral 1 denotes a disk on which an information signal is recorded in an encoded and modulated signal form suitable for recording (or reproducing) in advance. The information signal includes a determination flag indicating the type of a video signal as well as a video signal.

The video signal reproducing apparatus 100 includes: a pickup 2 for transforming an information signal recorded on the disk 1 to an electrical signal; a disk rotating device 3 for rotating the disk 1 at a certain revolution-per-minute (rpm) suitable for the disk 1; a material determination circuit 5 for determining the type of a video signal based on the determination flag included in the information signal; a conversion section 101 for converting the electrical signal transformed by the pickup 2 to an interlaced scan video signal and a progressive scan video signal; an encoder 7 for converting the interlaced scan video signal into an NTSC video format and outputs the result through an interlaced scan video output terminal 8 to an interlaced scan video monitor 103; and a color difference converter 10 for converting the progressive scan video signal output from the conversion section 101 into an analog color difference signal and outputs the result through a progressive scan video output terminal 11 to a progressive scan video monitor 104.

The conversion section 101 includes: an interlaced scan video signal reproduction circuit 4 for demodulating and decoding the electrical signal output from the pickup 2 and outputting the resultant signal as an interlaced scan video signal; an interlaced scan aspect ratio conversion circuit 6 for converting the aspect ratio of the interlaced scan video signal and outputs the result; an interlaced scan aspect ratio designating section 13 which is used by a user to designate the aspect ratio of the interlaced scan video monitor 103; an interlaced scan control circuit 12 for controlling the interlaced scan aspect ratio conversion circuit 6 based on the video signal type determined by the material determination circuit 5 and the type of the interlaced scan video monitor 103 designated by the interlaced scan designating section 13, and a progressive scan video signal conversion circuit 9 for converting the interlaced scan video signal having the converted aspect ratio into a progressive scan video signal and outputting the result.

The video signal reproducing apparatus 100 further includes: an aspect ratio conversion circuit 16 for converting the aspect ratio of a progressive scan video signal output from the progressive scan video signal conversion circuit 9 and outputting the result; a designating section 14 which is used by a user to designate the type of the progressive scan video monitor 104, and a control circuit 15 for controlling the aspect ratio conversion circuit 16 based on the video signal type determined by the material determination circuit 5 and the type of the progressive scan video monitor 104 designated by the designating section 14.

The operation of the thus-constructed video signal reproduction apparatus 100 of the present invention will be described with reference to FIGS. 1 through 11A–C.

Figure 2:
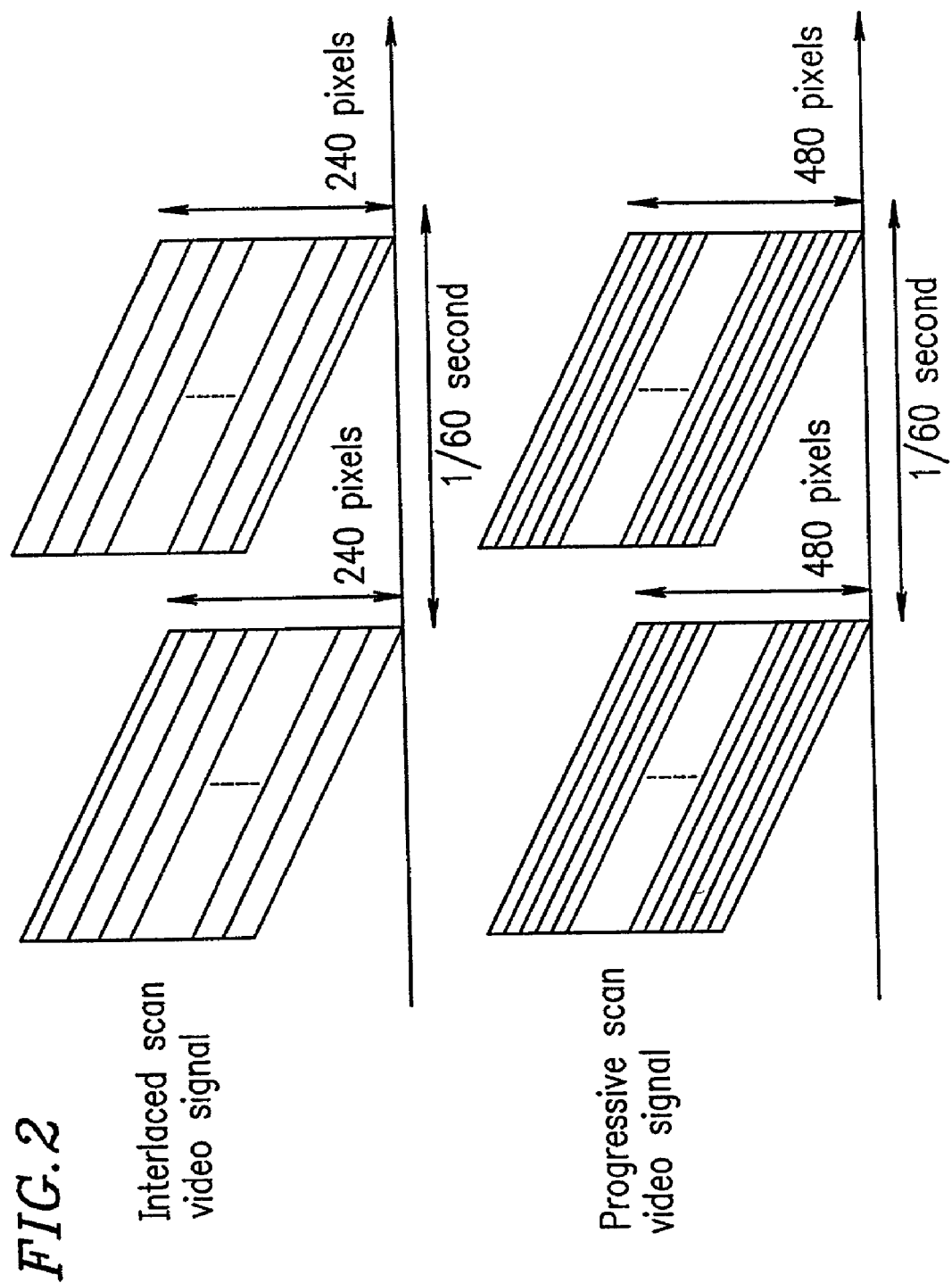
FIG. 2 is a schematic diagram showing the structure of a video signal recorded in a disk according to the example of the present invention.

FIG. 2 is a schematic diagram showing the structure of a video signal reproduced from the disk 1. In an interlaced scan video signal, one field of image is created in 1/60 second. One frame of image is composed of two fields. The number of vertical pixels of each of the two fields is 240. The scan lines of the two field are alternately arranged. In other words, a pixel of one field is disposed between two adjacent pixels of the other field in the vertical direction. In a progressive scan video signal, one frame is created in 1/60 second and the number of pixels of one frame in the vertical direction is 480. Both have a vertical frequency of 1/60 second. The number of horizontal scan lines of the progressive scan video signal is twice as many as that of the interlaced scan video signal. The horizontal scan frequency of the interlaced scan video signal is about 15.75 KHz, while that of the progressive scan video signal is double, i.e., about 31.5 KHz.

FIG. 3A is a schematic signal diagram showing the structure of the video signal reproduced from the disk 1. In the following examples, the aspect ratio of a video signal and the aspect ratios of an interlaced scan video monitor and a progressive scan video monitor all take the ratios 4:3 and/or 16:9. The present invention is not limited to these values. In the case of other aspect ratios, a ratio of length to width is only changed and similar functions and effects can be obtained As shown in FIG. 3A, the video signal reproduced from the disk 1 has three forms. A first form of video signal represents an image having information which fills a full screen of 4:3 (hereinafter referred to as a 4:3 full image 301). A second form of video signal represents an image of 16:9 in the middle of the 4:3 screen, the upper and lower portions of the screen being shaded (hereinafter referred to as a 4:3 letterbox image 302). A third form of video signal represents an image having information which fills a full screen of 16:9 (hereinafter referred to as a 16:9 full image 303).

FIG. 3B shows the aspect ratio of the interlaced scan video monitor 103. As shown in FIG. 3B, there are two types of monitors for the interlaced scan video monitor 103, one monitor 304 having an aspect ratio of 4:3 and the other monitor 305 having an aspect ratio of 16:9.

FIG. 3C shows the aspect ratio of the progressive scan video monitor 104. As shown in FIG. 3C, there are two types of monitors for the progressive scan video monitor 104, one monitor 306 having an aspect ratio of 4:3 and the other monitor 307 having an aspect ratio of 16:9.

The interlaced scan video signal reproduction circuit 4 reads a video signal recorded on the disk 1 from an output of the pickup 2, reproduces an interlaced scan video signal, and outputs the result to the interlaced scan aspect ratio conversion circuit 6. The material determination circuit 5 reads the determination flag from an output of the pickup 2 determines the type of the video signal, and outputs the result as a determination signal to the interlaced scan control circuit 12.

A user designates the type (aspect ratio) of the interlaced scan video monitor 103, through which the user intends to output an interlaced scan video signal, using the interlaced scan aspect ratio designating section 13. The interlaced scan control circuit 12 controls the interlaced scan aspect ratio conversion circuit 6 based on a determination signal output from the material determination circuit 5 and the type (aspect ratio) of the interlaced scan video monitor 103 designated by the interlaced scan aspect ratio designating section 13.

Figure 4:
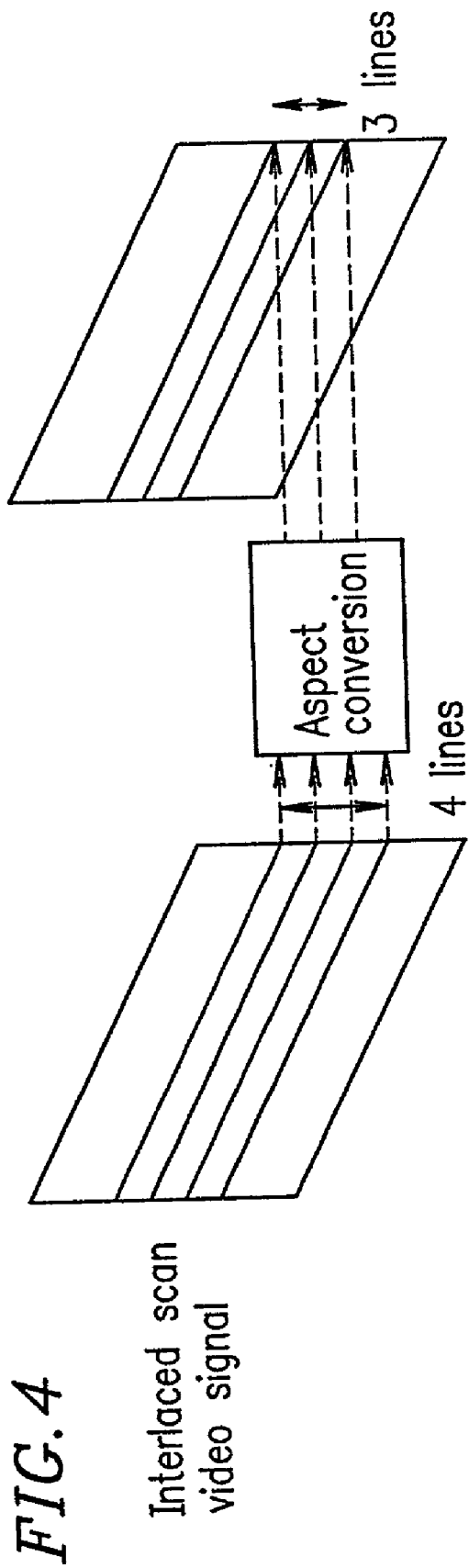
FIG. 4 is a schematic diagram for explaining the operation of an interlaced scan aspect ratio conversion circuit according to the example of the present invention.

FIG. 4 is a schematic diagram for explaining the operation of the interlaced scan aspect ratio conversion circuit 6. Assuming that the interlaced scan video monitor 103 has an aspect ratio of 4:3, the interlaced scan aspect ratio conversion circuit 6 has a function which compresses the 16:9 image 303 having an aspect ratio of 16:9 in the vertical direction. Specifically, in order to display the 16:9 image 303 on the 4:3 monitor 304 at the correct aspect ratio, 4 lines of information of an input video signal are subjected to a filtering process so that 3 lines of information are generated. Such a process is performed for the entire screen, so that the entire screen is compressed in the vertical direction. In this case, the displayed image has a correct aspect ratio (16:9), but leaving blanks in the upper and lower portions. Such portions are rendered black images. This aspect ratio conversion function can switch between a working state and a non-working state using the interlaced scan control circuit 12. In the case of the non-working state, the interlaced scan aspect ratio conversion circuit 6 outputs a received interlaced scan video signal without the aspect ratio conversion.

In FIG. 1, the user designates as the aspect ratio of the 16:9 image 303, through which the user intends to output an image, the monitor 304 having an aspect ratio of 4:3 or the monitor 305 having an aspect ratio of 16:9 using the interlaced scan aspect ratio designating section 13. The material determination circuit 5 outputs the aspect ratio of an image source, i.e., one of the 4:3 full screen 301 or the 4:3 letterbox screen 302, and the 16:9 screen 303, to the interlaced scan control circuit 12.

The interlaced scan control circuit 12 outputs the following three instructions to the interlaced aspect ratio conversion circuit 6.

(1) The interlaced scan control circuit 12 outputs a first instruction which causes the aspect ratio conversion function of the interlaced scan aspect ratio conversion circuit 6 to be in the non-working state when the material determination circuit 5 determines that the type of an image source is a 4:3 full image or a 4:3 letterbox image.

(2) The interlaced scan control circuit 12 outputs a second instruction which causes the aspect ratio conversion function of the interlaced scan aspect ratio conversion circuit 6 to be in the non-working state when the material determination circuit 5 determines that the type of the image source is a 16:9 image and the interlaced scan aspect ratio designating section 13 designates as the type of an interlaced scan video monitor a 16:9 interlaced scan video monitor.

(3) The interlaced scan control circuit 12 outputs a third instruction which causes the aspect ratio conversion function of the interlaced scan aspect ratio conversion circuit 6 to be in the working state when the material determination circuit 5 determines that the type of the image source is a 16:9 image and the interlaced scan aspect ratio designating section 13 designates as an interlaced scan video monitor a 4:3 interlaced scan video monitor.

The encoder 7 converts an output of the interlaced scan aspect ratio conversion circuit 6 to the NTSC video format. The encoder 7 outputs an interlaced scanned image having the NTSC video format through the interlaced scanned image output terminal 8 to the interlaced scan video monitor 103.

Figure 5C:
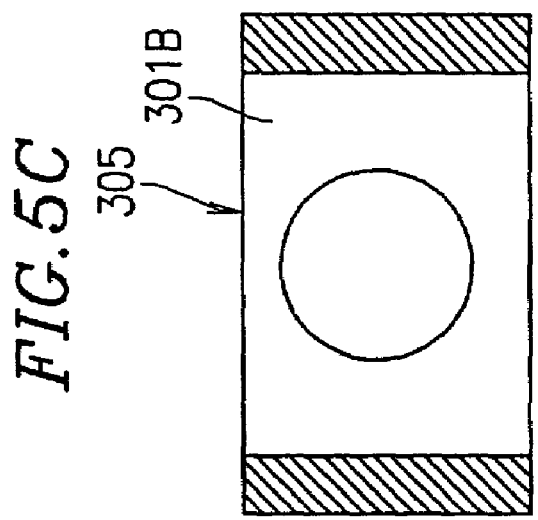
FIGS. 5A through 5C are schematic diagrams for explaining a 4:3 full image displayed on an interlaced scan video monitor according to the example of the present invention.
Figure 5B:
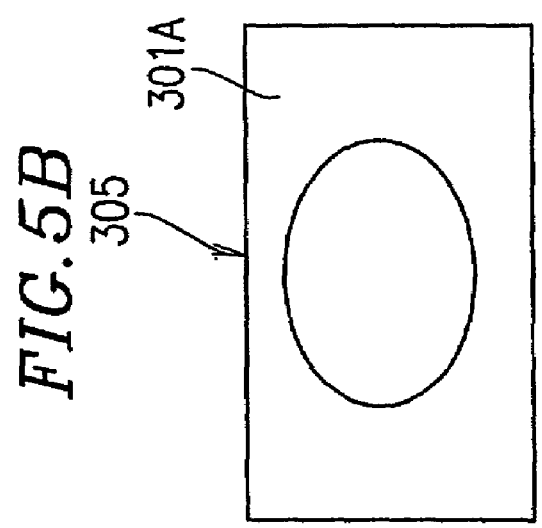
Figure 5A:
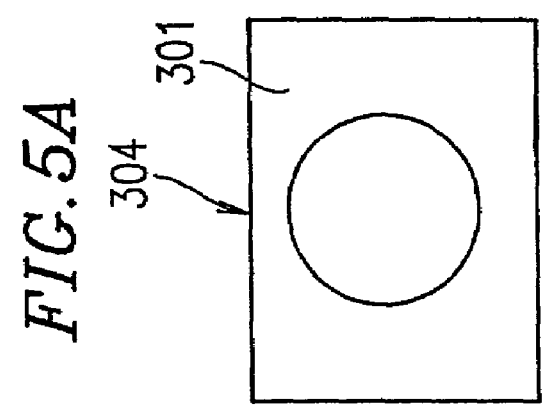

FIGS. 5A through 5C are schematic diagrams for explaining a 4:3 full image displayed on an interlaced scan video monitor. As shown in FIG. 5A, the 4:3 full image 301 displayed on the 4:3 interlaced scan video monitor 304 has the correct aspect ratio. However, a 4:3 full image 301A displayed by the 16:9 interlaced scan video monitor 305 does not have the correct aspect ratio, so that the displayed image is extended horizontally as shown in FIG. 5B. The 16:9 interlaced scan video monitor 305 includes a 4:3 output switch function since the standard aspect ratio of an interlaced scan video signal is 4:3. As shown in FIG. 5C, the 16:9 interlaced scan video monitor 305 can display a 4:3 full image 301B having the correct 4:3 aspect ratio using the 4:3 output switch function.

Figure 6A:
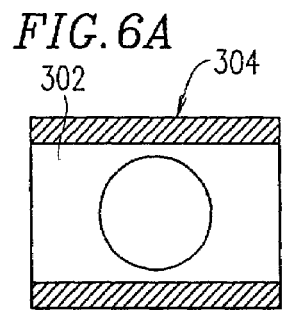
FIGS. 6A through 6D are schematic diagrams for explaining a 4:3 letterbox image displayed on an interlaced scan video monitor according to the example of the present invention.
Figure 6B:
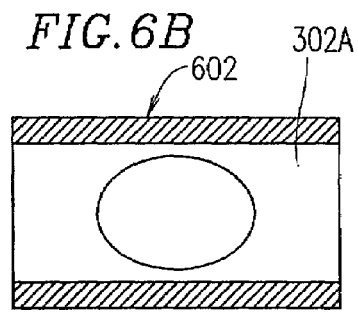
Figure 6C:
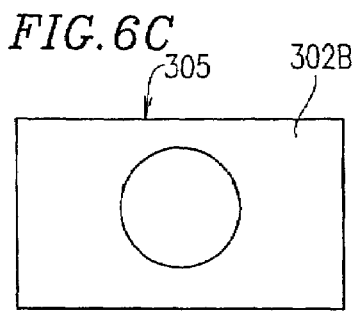
Figure 6D:
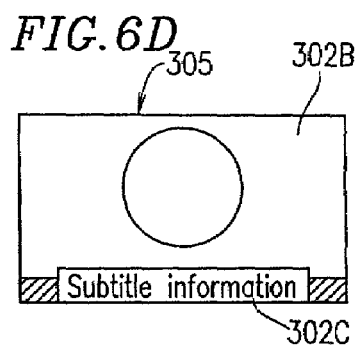

FIGS. 6A through 6D are schematic diagrams for explaining a 4:3 letterbox image displayed on an interlaced scan video monitor. As shown in FIG. 6A, the 4:3 letterbox image 302 displayed on the 4:3 interlaced scan video monitor 304 has the correct aspect ratio. However, as shown in FIG. 6B, a 4:3 letterbox image 302A displayed on the 16:9 interlaced scan video monitor 305 does not have the correct aspect ratio, so that the displayed image is extended horizontally. The interlaced scan video monitor includes a 4:3 letterbox image output switch function since the standard aspect ratio of interlaced scan video signal is 4:3. With the 4:3 letterbox output switch function, as shown in FIG. 6C, the 4:3 letterbox image 302A is extended both upward and downward so that a 4:3 letterbox image 302B fills the full screen. Therefore, the interlaced scan video monitor 305 can display a 4:3 letterbox image at a correct aspect ratio of 16:9. An image source may have subtitle information 302C at the lower blank portion of an image. In this case, when a 4:3 letterbox image (302A) is extended upward and downward so that the 4:3 letterbox image (302B) fills a full screen and is displayed at a correct aspect ratio of 16:9, the subtitle information 302C disappears. To avoid such a situation, the interlaced scan video monitor 305 has a switch function with which the subtitle information 302 is shifted upward to be viewed on the screen.

Figure 7A:
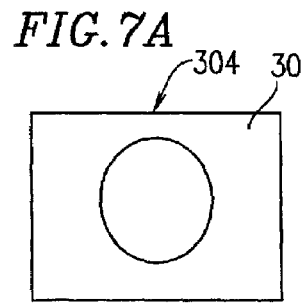
FIGS. 7A through 7C are schematic diagrams for explaining a 16:9 image displayed on an interlaced scan video monitor according to the example of the present invention.
Figure 7B:
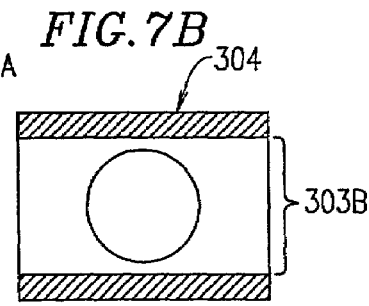
Figure 7C:
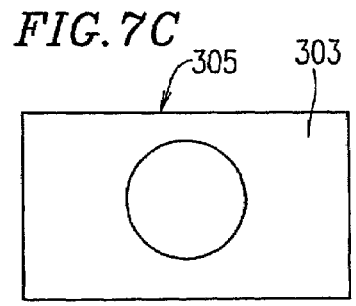

FIGS. 7A through 7C are schematic diagrams for explaining a 16:9 image displayed on an interlaced scan video monitor. As shown in FIG. 7A, when a 16:9 image 303A is displayed as it is on the 4:3 interlaced scan video monitor 304, the image does not have the correct aspect ratio, such that the displayed image is extended vertically. However, if the user teaches the interlaced scan aspect ratio designating section 13 that an interlaced scan video monitor to be connected to the apparatus 100 is the 16:9 interlaced scan monitor 305, the interlaced scan aspect ratio conversion circuit 6 is activated and the aspect ratio is converted so that an image (16:9 image 303B) is correctly displayed as shown in FIG. 7B. In addition, as shown in FIG. 7C, the 16:9 interlaced scan video monitor 305 displays a 16:9 image 303 at a correct aspect ratio of 16:9.

Specifically, in the video signal reproduction apparatus 100, the interlaced scan video monitor can display images having a correct aspect ratio in any combination of 3 types of image sources, i.e., the 4:3 full image, the 4:3 letterbox image, and the 16:9 image with 2 types of video monitors, i.e., the 4:3 monitor and the 16:9 monitor.

An output of the interlaced scan aspect ratio conversion circuit 6 is input to the progressive scan video signal conversion circuit 9. The progressive scan video signal conversion circuit 9 converts an input interlaced scan video signal to a progressive scan video signal, and outputs the result.

FIGS. 8A through 8D are schematic diagrams for explaining the operation of the aspect ratio conversion circuit 16 of the video signal reproduction apparatus 100 of the present invention.

Referring to FIG. 8A, the aspect ratio conversion circuit 16 has a horizontal aspect ratio conversion function which compresses the 4:3 full image 301 in the horizontal direction in order to display the 4:3 full image 301 on the 16:9 progressive scan video monitor 307 at the correct aspect ratio. Specifically, as shown in FIG. 8A, 4 pixels of information 81 included in the 4:3 full image 301 of an input progressive scan video signal are subjected to a filtering process so that 3 pixels of information 82 are generated. Such a process is performed for the entire 4:3 full image 301, so that the entire 4:3 full image 301 is compressed in the horizontal direction. In this case, the 4:3 full image 301 is converted to a correct ratio of 4:3 on the 16:9 progressive scan video monitor 307. However, the horizontal compression of the 4:3 full image 301 leaves blanks in the right and left portions. Such portions are rendered black images.

Referring to FIG. 8B, the aspect ratio conversion circuit 16 has a vertical aspect ratio conversion function which compresses the 4:3 letterbox image 302 in the vertical direction in order to display the 4:3 letterbox image 302 on the 16:9 progressive scan video monitor 307 at the correct aspect ratio. Specifically, as shown in FIG. 8B, 3 pixels of information 83 included in the 4:3 letterbox image 302 of an input progressive scan video signal are subjected to a filtering process so that 4 pixels of information 84 are generated. Such a process is performed for the entire 4:3 letterbox image 302, so that the entire 4:3 letterbox image 302 is expanded in the vertical direction, whereby the 4:3 letterbox image 302 is converted into the 16:9 screen.

As shown in FIG. 8C, the aspect ratio conversion circuit 16 has a vertical display position shift function with which after the 4:3 letterbox image 801 is extended in the vertical direction, the extended 4:3 letterbox image 801 is shifted so that a vertical center position 803 of the 4:3 letterbox image 801 is moved to a center position 804 (by a predetermined amount upward). This function is realized by changing the position of a display image signal with respect to a vertical synchronization signal.

These three aspect ratio conversion functions each can select a working or non-working state using the control circuit 15. When all of the conversion functions are in the non-working state, the aspect ratio conversion circuit 16 outputs an input progressive scan video signal without an aspect ratio conversion.

In FIG. 1, the user designates as the type of the interlaced scan video monitor 103 for display the 4:3 interlaced scanned video monitor 304 or the 16:9 interlaced scanned video monitor 305 using the interlaced scan aspect ratio designating section 13. The user also designates in the designating section 14 whether the type of the progressive scan video monitor 104 is the 4:3 progressive scanned video monitor 306 or the 16:9 progressive scanned video monitor 307 and whether or not the vertical display position shift is executed. On the other hand, the material determination circuit 5 outputs the type of the image source, i.e., one of the 4:3 full image 301, the 4:3 letterbox image 302, and the 16:9 image 303, to the interlaced scan control circuit 12 and the control circuit 15.

The control circuit 15 outputs the following five instructions to the aspect ratio conversion circuit 16.

(1) The control circuit 15 causes both the horizontal and vertical aspect ratio conversion functions and the vertical display position shifting function of the aspect ratio conversion circuit 16 to be in the non-working state when the material determination circuit 5 determines that the aspect ratio of the image source is the 4:3 full image 301 or the 4:3 letterbox image 302 and the type of the progressive scan video monitor 104 designated by the designating section 14 is the 4:3 progressive scan video monitor 306.

(2) The control circuit 15 causes the horizontal and vertical aspect ratio conversion functions of the aspect ratio conversion circuit 16 to be in the working state and in the non-working state, respectively, when the material determination circuit 5 determines that the aspect ratio of the image source is the 4:3 full image 301 and the type of the progressive scan video monitor 104 designated by the designating section 14 is the 16:9 progressive scan video monitor 307.

(3) The control circuit 15 causes the vertical and horizontal aspect ratio conversion functions and the vertical display position shifting function of the aspect ratio conversion circuit 16 to be in the working state, in the non-working state, and in the non-working state, respectively, when the material determination circuit 5 determines that the aspect ratio of the image source is the 4:3 letterbox image 302, the type of the progressive scan video monitor 104 designated by the designating section 14 is the 16:9 progressive scan video monitor 307, and the vertical position shift is not set in the designating section 14.

(4) The control circuit 15 causes the vertical aspect ratio conversion function and the vertical display position shifting function of the aspect ratio conversion circuit 314 to be in the working state and causes the horizontal aspect ratio conversion function of the aspect ratio conversion circuit 314 to be in the non-working state when the material determination circuit 5 determines that the aspect ratio of the image source is the 4:3 full image 301 or the 4:3 letterbox image 302, the type of the progressive scan video monitor 104 designated by the designating section 14 is the 16:9 progressive scan video monitor 307, and the vertical position shift is set in the designating section 14.

(5) The control circuit 15 causes both the horizontal and vertical aspect ratio conversion functions and the vertical display position shifting function of the aspect ratio conversion circuit 16 to be in the non-working state when the material determination circuit 5 determines that the aspect ratio of the image source is the 16:9 image 303.

The color difference converter 10 converts a progressive scan video signal to a color difference video signal, and outputs the color difference video signal through the progressive scanned image output terminal 11 to the progressive scan video monitor 104.

Figure 9A:
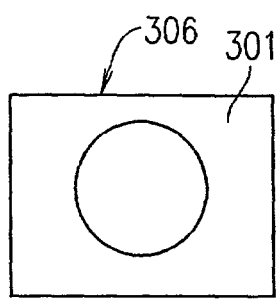
FIGS. 9A through 9C are schematic diagrams for explaining a 4:3 full image displayed on a progressive scan video monitor according to the example of the present invention.
Figure 9B:
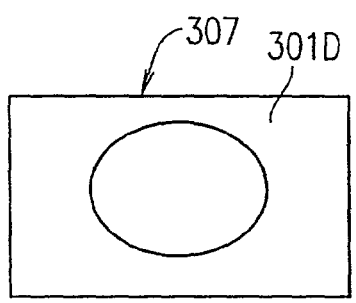
Figure 9C:
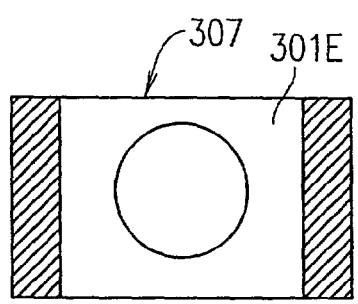

FIGS. 9A through 9C are schematic diagrams for explaining a 4:3 full image displayed on a progressive scan video monitor. As shown in FIG. 9A, a 4:3 full image 301 displayed on the 4:3 progressive scanned video monitor 306 has the correct ratio. However, a 4:3 full image 301D displayed on the 16:9 progressive scanned video monitor 307 does not have the correct ratio, so that the displayed image is extended horizontally. The progressive scan video monitor 307 has a 4:3 output switch function since the standard aspect ratio of progressive scan video signal is 4:3. With the 4:3 output switch function, as shown in FIG. 9C, a 4:3 full image 301E is displayed at a correct aspect ratio of 4:3.

Figure 10A:
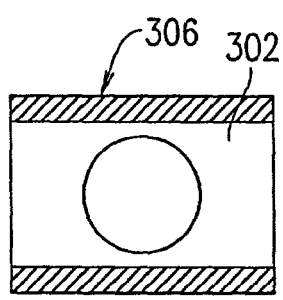
FIGS. 10A through 10F are schematic diagrams for explaining a 4:3 letterbox image displayed on a progressive scan video monitor according to the example of the present invention.
Figure 10B:
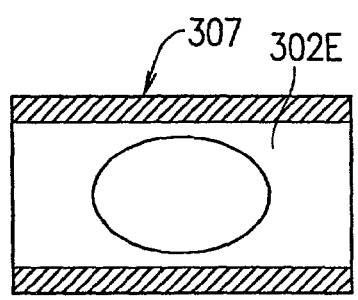
Figure 10C:
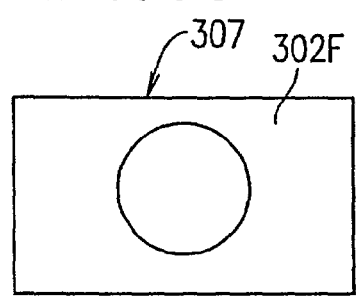

FIGS. 10A through 10F are schematic diagrams for explaining a 4:3 letterbox image displayed on a progressive scan video monitor. As shown in FIG. 10A, a 4:3 letterbox image 302 displayed on the 4:3 progressive scan video monitor 306 has the correct aspect ratio. As shown in FIG. 10B, however, a 4:3 letterbox image 302E displayed on the 16:9 progressive scan video monitor 307 does not have the correct aspect ratio, so that the displayed image is extended horizontally. The progressive scan video monitor has a 4:3 letterbox image output switch function since the standard aspect ratio of a progressive scan video signal is 4:3. With the 4:3 letterbox output switch function, as shown in FIG. 10C, the 4:3 letterbox image is extended both upward and downward so that a 4:3 letterbox image 302F fills the full screen. Therefore, the progressive scan video monitor 306 can display a 4:3 letterbox image at a correct aspect ratio of 16:9.

Figure 10D:
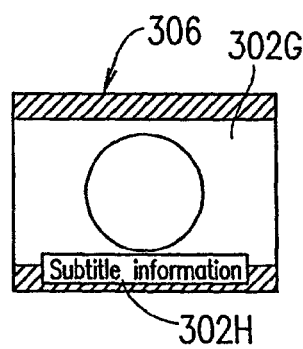
Figure 10E:
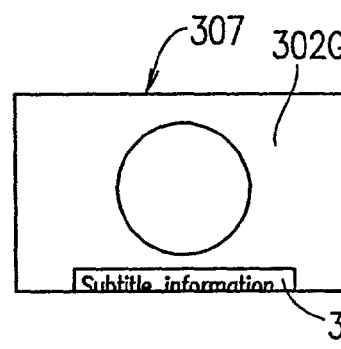
Figure 10F:
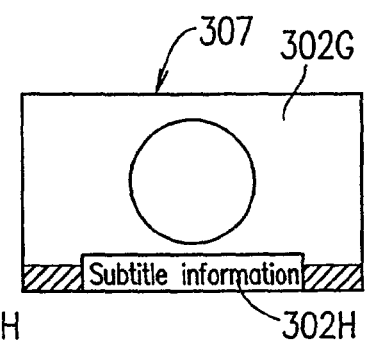

As shown in FIG. 10D, some image sources may have subtitle information 302H at the lower blank portion of an image. In this case, as shown in FIG. 10E, when a 4:3 letterbox image 302G is extended upward and downward, the subtitle information 302C at the lower blank portion of the 4:3 letterbox image 302G disappears. In this case, the designating section 14 designates the vertical display position shift. Therefore, as shown in FIG. 10F, the aspect ratio conversion circuit 16 shifts the 4:3 letterbox image 302G upward so that the subtitle information 302H can be viewed in the 16:9 progressive scan video monitor 307.

Figure 11A:
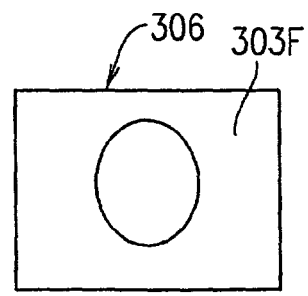
FIGS. 11A through 11C are schematic diagrams for explaining a 16:9 image displayed on a progressive scan video monitor according to the example of the present invention.
Figure 11B:
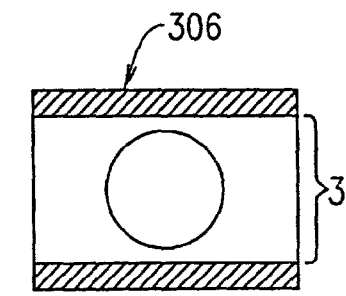
Figure 11C:
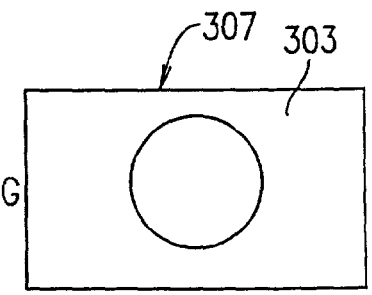

FIGS. 11A through 11C are schematic diagrams for explaining a 16:9 image output on a progressive scan video monitor. As shown in FIG. 11A, a 16:9 image 303F displayed on the 4:3 progressive scan video monitor 306 does not have the correct aspect ratio, so that the displayed image is extended vertically. However, if the user teaches the designating section 14 that a progressive scan monitor to be connected to the apparatus 100 is the 16:9 progressive scan monitor 307, the aspect ratio conversion circuit 16 is activated and the aspect ratio is converted so that a 16:9 image 303G is correctly displayed as shown in FIG. 11B. In addition, as shown in FIG. 11C, the 16:9 progressive scan video monitor 307 displays a 16:9 image 303 at a correct aspect ratio of 16:9.

As described above, in the video signal reproduction apparatus 100 of the present invention, the progressive scan video monitor 104 can display images at corresponding correct aspect ratios in any combination of the image sources of the 4:3 full image 301, the 4:3 letterbox image 302, and the 16:9 image 303 with the 4:3 progressive scan video monitor 306 and the 16:9 progressive scanned image monitor 307. Further, for the 4:3 letterbox image 302G having a subtitle at the lower blank portion of a screen, the disappearance of the subtitle can be prevented.

Note that, in the example, the image sources are limited to the 3 types, i.e., the 4:3 full image, the 4:3 letterbox image, and the 16:9 image. However, there may be four or more image sources. In the example, two aspect ratios, i.e., 4:3 and 16:9 are used. If the aspect ratio conversion function of the aspect ratio conversion circuit is changed in accordance with the aspect ratios of the image source, the aspect ratio is not limited to two. The present invention can be applied to a case where three or more aspect ratios are used.

Further, in FIG. 1, each component, i.e., the material determination circuit 5, the aspect ratio conversion section 102, the encoder 7, and the color difference converter 10, are in the form of hardware such as a circuit, but may be replaced with software.

The aspect ratio conversion circuit 16 can shift an image display position upward by a predetermined number of lines. Alternatively, the number of lines by which the image display position is shifted may be variable so that the amount of the upward shift can be changed.

Further, in the examples, the description is given of a video signal recorded on a disk medium. The present invention can also be applied to a video signal recorded in tape media and a video signal included in an information signal transmitted by satellite broadcast, ground-wave broadcast, or the like.

As described above, according to the present invention, a video signal reproduction apparatus is provided in which images can be displayed at corresponding correct aspect ratios in any combination of image sources having different aspect ratios with monitors having different aspect ratios.

Further, according to the present invention, a video signal reproduction apparatus is provided in which when a 4:3 letterbox image has a subtitle at the lower blank portion of a screen, the disappearance of the subtitle can be prevented.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A video signal reproduction apparatus for receiving an information signal including a video signal and a determination signal indicating a type of the video signal, and reproducing the video signal included in the information signal, comprising:

a conversion section for converting the video signal into an interlaced scan video sianal and a progressive scan video signal, the conversion section converting an aspect ratio of the interlaced scan video signal and outputting the converted interlaced scan video signal through an interlaced scan video output terminal to an interlaced scan video monitor; and an aspect ratio conversion section for converting an aspect ratio of the progressive scan video signal output from the conversion section and outputting the converted progressive scan video signal through a progressive scan video output terminal to a progressive scan video monitor, wherein the aspect ratio conversion section converts the aspect ratio of the progressive scan video signal based on the determination signal indicating the type of the video signal and monitor information indicating a type of the progressive scan video monitor; and the converted interlaced scan video signal is output to the interlaced scan video output terminal and the converted progressive scan video signal is output to the progressive scan video output terminal, concurrently.

2. A video signal reproduction apparatus according to claim 1, wherein the aspect ratio conversion section converts the aspect ratio of the progressive scan video signal so that the progressive scan video signal is displayed on the progressive scan video monitor at a correct aspect ratio.

3. A video signal reproduction apparatus according to claim 1, wherein:

the aspect ratio includes first and second aspect ratios;

the video signal includes a video signal representing a first image having the first aspect ratio and a second image having the second aspect ratio;

the progressive scan video monitor includes a first monitor having the first aspect ratio and a second monitor having the second aspect ratio; and the aspect ratio conversion section converts the aspect ratio of the progressive scan video signal when the determination signal indicates the first image as having the first aspect ratio and the monitor information indicates the second monitor as having the second aspect ratio.

4. A video signal reproduction apparatus according to claim 3, wherein: the first image includes a full image having the first aspect ratio; and the aspect ratio conversion section converts the aspect ratio of the progressive scan video signal so that the full image represented by the progressive scan video signal is compressed in a horizontal direction, when the determination signal indicates the full image.

5. A video signal reproduction apparatus according to claim 4, wherein:

the second monitor having the second aspect ratio extends the full image having the first aspect ratio in a horizontal direction by a factor of (M/N) where M and N are integers and M>N; and the aspect ratio conversion section compresses the full image in the horizontal direction by a factor of (N/M) so that the full image having the first aspect ratio is displayed on the second monitor having the second aspect ratio at a correct aspect ratio.

6. A video signal reproduction apparatus according to claim 4, wherein the aspect ratio conversion section renders a blank portion resulting from the compression of the full image in the horizontal direction as a black image.

7. A video signal reproduction apparatus according to claim 3, wherein:
the first image includes a letterbox image including the first aspect; and
when the determination signal indicates the letterbox image, the aspect ratio conversion section converts the aspect ratio of the progressive scan video signal so that the letterbox image represented by the progressive scan video signal is extended in a vertical direction.

8. A video signal reproduction apparatus according to claim 7, wherein:
the second monitor having the second aspect ratio extends the letterbox image having the first aspect ratio in a horizontal direction by a factor of (M/N) where M and N are integers and M>N: and
the aspect ratio conversion section extends the letterbox image in a vertical direction by a factor of (M/N) so that the letterbox image having the first aspect ratio is displayed on the second monitor having the second aspect ratio at a correct aspect ratio.

9. A video signal reproduction apparatus according to claim 7, wherein:
the letterbox image includes a subtitle displayed at an upper or lower portion of the letterbox image; and
the aspect ratio conversion section shifts the letterbox image represented by the progressive scan video signal so that the subtitle is prevented from disappearing from the second monitor having the second aspect ratio included in the progressive scan video monitor when the letterbox image is extended in the vertical direction.

10. A video signal reproduction apparatus according to claim 3, wherein the first aspect ratio is 4:3 and the second aspect ratio is 16:9.

11. A video signal reproduction apparatus according to claim 1, wherein the aspect ratio conversion section includes:
an aspect ratio conversion circuit for converting an aspect ratio of the progressive scan video signal and outputting the converted progressive scan video signal to the progressive scan video monitor;
a designating section for designating the monitor information indicating the type of the progressive scan video monitor; and
a control circuit for controlling the aspect ratio conversion circuit based on the determination signal and the monitor information designated by the designating section.

12. A video signal reproduction apparatus according to claim 1, wherein the conversion section includes:
an interlaced scan video signal reproduction section for reproducing the video signal as an interlaced scan video signal having 60 fields per second;
an interlaced scanned aspect ratio conversion section for converting an aspect ratio of the interlaced scan video signal reproduced by the interlaced scan video signal reproduction section; and
a progressive scan video signal conversion section for converting the interlaced scan video signal, the aspect ratio of the interlaced scan video signal being converted by the interlaced scan video signal reproduction section, into the progressive scan video signal.

13. A video signal reproduction apparatus according to claim 12, wherein the conversion section further includes:
an interlaced scan designating section for designating interlaced scan monitor information indicating a type of the interlaced scan video monitor; and
an interlaced scan control circuit for controlling the interlaced scan aspect ratio conversion section based on the determination signal and the interlaced scan monitor information designated by the interlaced scan designating section.

* * * * *